(12) United States Patent
Franke

(10) Patent No.: US 6,747,439 B2
(45) Date of Patent: Jun. 8, 2004

(54) CONDITIONING OF A RECHARGEABLE BATTERY

(75) Inventor: Michael Franke, Darmstadt (DE)

(73) Assignee: Braun GmbH (DE)

( * ) Notice: Subject to any disclaimer, the term of this patent is extended or adjusted under 35 U.S.C. 154(b) by 0 days.

(21) Appl. No.: 10/317,325

(22) Filed: Dec. 12, 2002

(65) Prior Publication Data

US 2003/0222622 A1 Dec. 4, 2003

(30) Foreign Application Priority Data

May 28, 2002 (DE) .......................... 102 23 557

(51) Int. Cl.⁷ .............................. H02J 7/00; H02J 7/04
(52) U.S. Cl. ...................................... 320/133; 320/155
(58) Field of Search ............................. 320/133, 131, 320/132, 135, 149, 155, 6.21; 324/428

(56) References Cited

U.S. PATENT DOCUMENTS

| | | | | |
|---|---|---|---|---|
| 4,849,681 A | * | 7/1989 | Munnig Schmidt et al. | 320/133 |
| 5,287,286 A | * | 2/1994 | Ninomiya | 702/63 |
| 5,793,188 A | * | 8/1998 | Cimbal et al. | 320/130 |
| 6,208,116 B1 | | 3/2001 | Fischedick | 320/125 |
| 6,236,189 B1 | * | 5/2001 | Franke | 320/136 |

FOREIGN PATENT DOCUMENTS

| | | |
|---|---|---|
| DE | 44 09 736 A1 | 9/1995 |
| DE | 199 05 550 A1 | 8/2000 |
| EP | 300 537 B1 | 4/1992 |
| WO | WO 99 10961 | 3/1999 |

* cited by examiner

Primary Examiner—Pia Tibbits
(74) Attorney, Agent, or Firm—Fish & Richardson P.C.

(57) ABSTRACT

Methods and devices for the conditioning of a rechargeable battery. The methods include providing a fully charged battery and discharging that battery to a voltage threshold value. The time required to discharge the rechargeable battery to the voltage threshold value is measured and then compared to a reference value. If the discharge time is less than the reference value, the battery is then further discharged. The methods can be applied to rechargeable batteries used in consumer products such as electric shaver and electric toothbrushes. The devices include a rechargeable battery, a second device that detects whether the device is connected to an external energy sources, and an electronic circuit. The electronic circuit discharges the battery by way of a load only if the device is connected to an external energy source. The devices can include appliances such as an electronic shaver or an electronic toothbrush.

20 Claims, 2 Drawing Sheets

CONDITIONING OF A RECHARGEABLE BATTERY

CROSS REFERENCE TO RELATED APPLICATION

This application claims priority to German Patent Application No. DE 102 23 557.0, filed May 28, 2002, which is incorporated herein by reference in its entirety.

TECHNICAL FIELD

This invention relates to batteries, and more particularly to rechargeable batteries.

BACKGROUND

DE 199 05 550 depicts a method for determining or indicating the charge state of a primary or secondary battery. Essentially, the battery is discharged so that only a minimum residual charge remains. The time required for the battery to be discharged (i.e., discharge time) is measured by a connected consumer measuring the time required for the battery voltage to drop to a first voltage threshold value, assuming the consumer has an essentially constant current consumption over an average time period. When the first voltage threshold value has been reached, it is reduced by an amount that depends on the discharge time measured. If the consumer further discharges the battery, so that the battery voltage drops still further, reaching the reduced voltage threshold value is an indicator for the discharge of the battery to a particular residual charge, i.e. for the presence of a low charge state of the battery.

DE 44 09 736 depicts a method and a device for caring for an accumulator (i.e., a rechargeable battery) incorporated in an accumulator-operated device wherein the memory effect is counteracted. In this known method, every few months the accumulator is automatically fully discharged and then fully recharged again. This accumulator care is only carried out if the accumulator-operated device is connected to the electrical outlet by means of a charging set, and if recharging after discharging is therefore certain. If the device is operated as described above, i.e. if the accumulator is always discharged for only a few minutes before being completely charged again, then accumulator care at shorter intervals would be desirable. On the other hand, accumulator care can be entirely done without if during operation of the device the accumulator is always first completely discharged before it is charged again.

SUMMARY

The present invention includes methods and devices for the conditioning of a rechargeable battery in a manner reflecting the rechargeable battery's state at the time the conditioning is performed.

Conditioning is intended to prevent as far as possible the changes in battery characteristics otherwise caused by ageing and by the memory effect.

In several aspects, the invention features a method of conditioning a rechargeable battery. In one aspect the invention features a method of conditioning a rechargeable battery, including providing a fully charged rechargeable battery and measuring a discharge time for which the voltage of the battery takes to decrease to a voltage threshold value. The discharge time is compared to a reference value, and if the discharge time is less than the reference value, the battery is shorted through a discharge load to further discharge the battery.

In the present application, discharge time does not refer to the time during which the battery voltage drops only as a result of self-discharge of the battery, but instead, discharge time refers to the time it takes for the battery to be discharged by way of a connected consumer, for example a device being operated by the consumer In some embodiments, in addition to the discharge time, the current which flows during discharge is also measured, and from it, the charge quantity taken from the battery is determined. The charge quantity determined is compared with a comparison value, and if the battery voltage has dropped to the voltage threshold value before the charge quantity which corresponds to the comparison value has been taken from the battery, the battery is fully discharged.

In other embodiments, the time which has passed since the battery voltage last dropped to the voltage threshold value is also measured. If for example a device operated by the rechargeable battery is always used for a few minutes only before the battery is fully recharged again following use, the battery voltage is unlikely to drop to the voltage threshold value for some time. The same applies if, for an extended period, the device is not used at all or is seldom used. If this time exceeds a specified maximum time, in certain embodiments, the battery is discharged until the battery voltage drops to the voltage threshold value, and the discharge time which has passed since full load or battery change, or the charge quantity which has been taken since full load or battery change, is measured; the measured value is compared with the reference value or to the comparison value, and, if necessary, the battery is fully discharged. If in the case of exceeding the maximum period, the battery voltage is already below the voltage threshold value, the battery is fully discharged. Accordingly, the rechargeable battery is only fully discharged if this is necessary for maintaining the full service life of the battery, i.e. for getting rid of the memory effect. On the other hand, battery conditioning is not required if, during operation, the battery gets discharged frequently enough to the extent that the battery voltage drops below the voltage threshold value before the battery is charged again.

In another embodiment, the time is also measured which has passed since the battery was last charged or changed. If this time exceeds a minimum time and if during this time the battery voltage has dropped to the voltage threshold value as a result of self-discharge alone, then a display is activated which signals ageing, i.e. the need for a change of battery.

In another embodiment, the battery is recharged after discharge. In still another embodiment, directly after recharging, a complete battery conditioning cycle including complete discharge and subsequent recharge is performed. If the discharge time measured or the charge quantity taken is again below the reference value or comparison value, this indicates an aged battery. The display which signals the necessity for changing the battery is then activated.

This additional battery care cycle is preferably carried out by automatic discharge of the battery via a load resistor and automatic recharge. However, it can also be carried out by the user through normal operation of the device.

One aspect of the invention features an electrical appliance, which includes a discharge load and a rechargeable battery for powering the electrical appliance, which is connected through a switch to the discharge load and used for powering the discharge load. Additionally, the electrical appliance includes a connector for connecting the appliance to an external source of electrical energy, and an electronic circuit that discharges the rechargeable battery by shorting the rechargeable battery through the discharge load only while the appliance is connected to the external energy source.

In some embodiments, the electronic circuit measures a discharge time for which the voltage of the battery takes to decrease to a voltage threshold value, compares the discharge time to a reference value; and if the discharge time is less than the reference value, shorts the battery through the discharge load to further discharge the battery.

In some embodiments, the electronic circuit measures a current flow during discharge, determines a charge quantity from the measured current flow during the measured discharge time, compares the determined charge quantity with the charge quantity of a reference value, and if the battery voltage drops to the voltage threshold value before the charge quantity corresponding to the reference value is released, shorts the battery through the discharge load to further discharge the battery.

In some embodiments, shorting the battery through the discharge load fully discharges the battery.

In some embodiments, the current flow is measured while also measuring the discharge time.

In some embodiments, the electronic circuit measures a first time interval which has passed since the battery voltage last dropped to the voltage threshold value, determines whether the first time interval exceeds a maximum reference time, and if the first time interval exceeds the maximum reference time, shorts the battery through the discharge load to discharge the battery until the battery voltage drops to the voltage threshold value.

In some embodiments, the electronic circuit recharges the battery after shorting the rechargeable battery.

In some embodiments, the discharge load is a resistor disposed within the appliance.

In some embodiments, the electronic appliance is an electrical shaver or an electric toothbrush.

The details of one or more embodiments of the invention are set forth in the accompanying drawings and the description below. Other features, objects, and advantages of the invention will be apparent from the description and drawings, and from the claims.

DESCRIPTION OF DRAWINGS

Like reference symbols in the various drawings indicate like elements.

DETAILED DESCRIPTION

Figure 1:
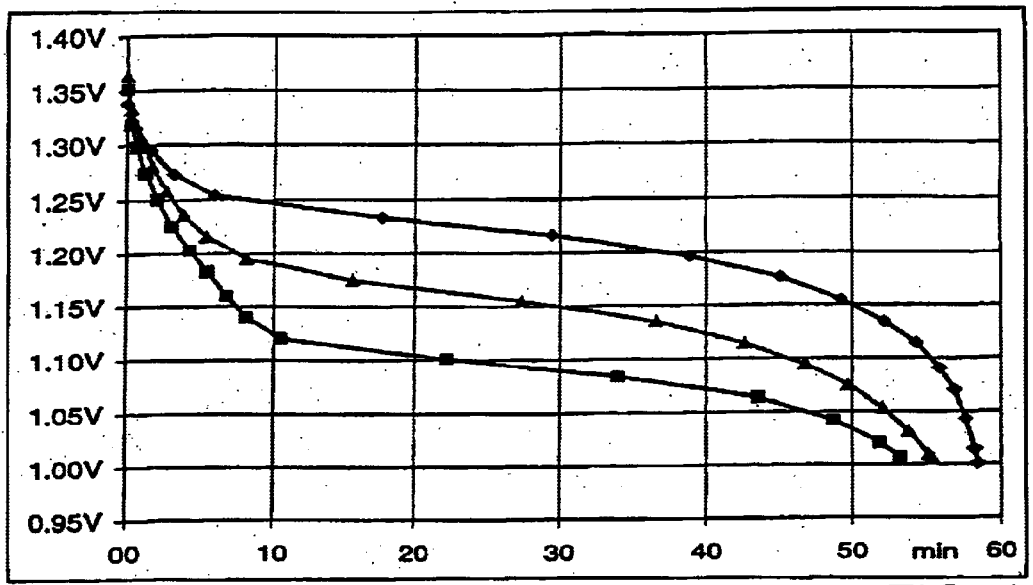
FIG. 1 is a graph depicting typical discharge characteristics of a rechargeable battery

FIG. 1 shows typical discharge characteristics of a rechargeable battery. The top curve shows the time-dependent gradient of the voltage of a new battery which, starting from its fully charged state (voltage 1.35 V), is completely discharged (voltage<1 V) over a period of time of 50 minutes. If a battery is operated for a significant period of time (e.g., several years) in such a way that it is only discharged for a few minutes before it is fully charged again, then the lowest gradient shown in FIG. 1 results when the battery is fully discharged. If the battery is then repeatedly fully charged and fully discharged several times, then the middle gradient shown in FIG. 1 results. The difference between the top gradient and the middle gradient is due to ageing, whereas the difference between the bottom gradient and the middle gradient is due to the memory effect.

Figure 2:
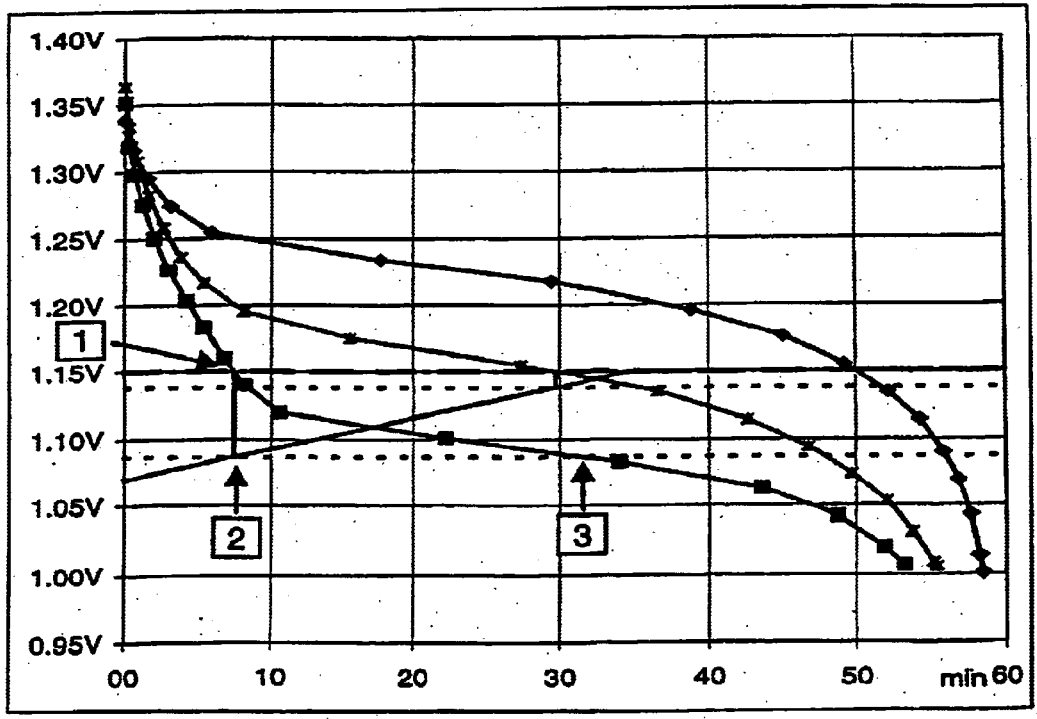
FIG. 2 is a graph depicting an example of the discharge characteristics of a rechargeable battery.
Figure 3:
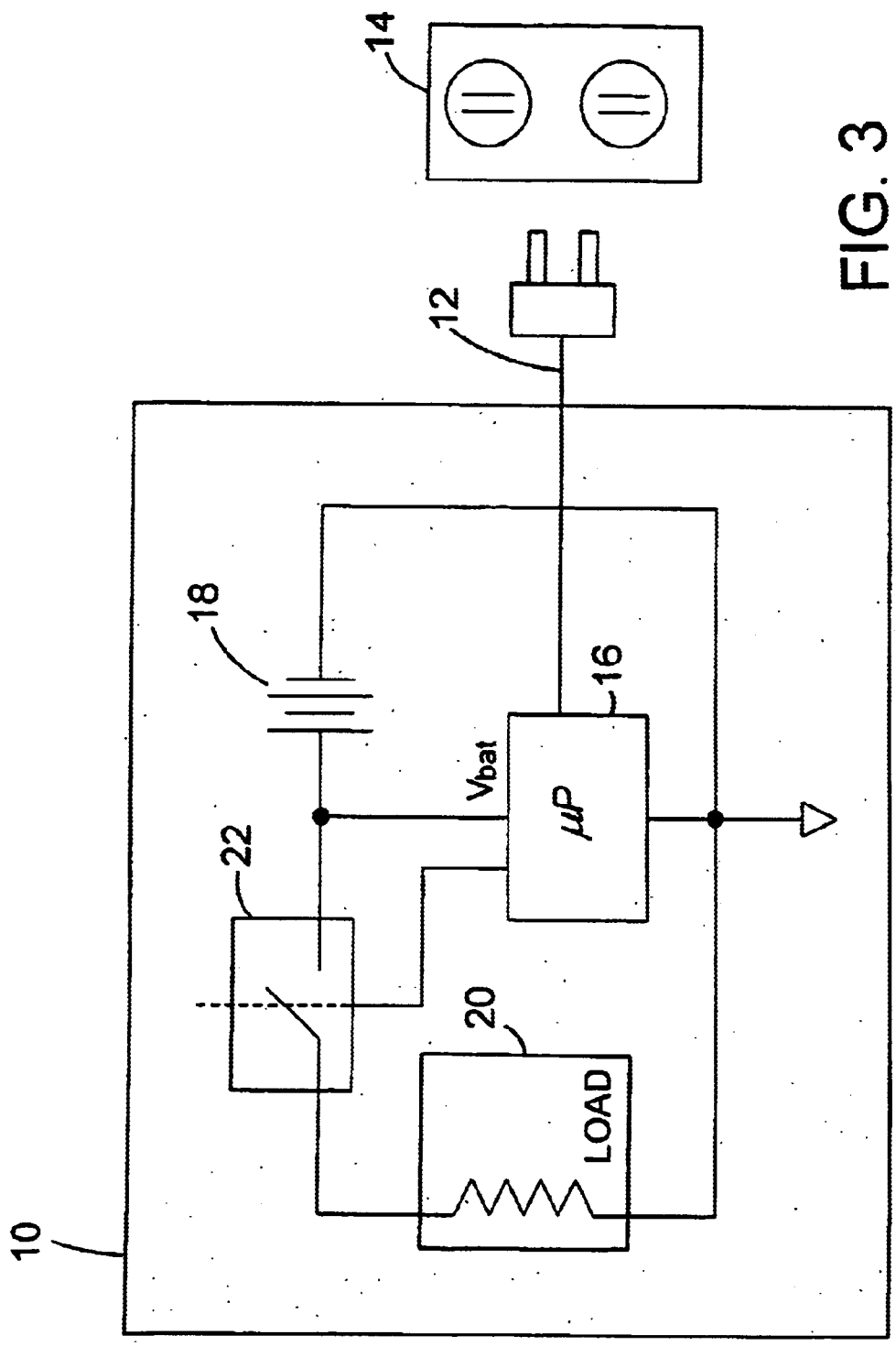
FIG. 3 depicts an appliance having a rechargeable battery.

Referring to FIG. 3, the methods and devices described herein can be applied to battery-operated devices 10, for example an electrical shaver or an electrical toothbrush that includes a built-in charging circuit and which can, for example, be recharged using a cable 12 connected to an electrical outlet 14 or a separate charging set. Charging is preferably carried out automatically by an electronic circuit, for example a microcontroller 16, incorporated in the device. Voltage threshold value, maximum time, minimum time and reference value or comparison value are all determined depending on the typical current consumption of the device 10, the capacity of the battery 18 used in the device, the minimum operating voltage required by the device 10, and, if applicable, further parameters of the battery 18 and/or of the temperature. These values are stored in the microcontroller 16. In the example shown in FIG. 2, the voltage threshold value is 1.15 V and the reference value for the discharge time is 7.4 mm. In order to implement the method according to the invention, i.e. in order to discharge the battery 18 for the purpose of battery conditioning without the need for action by a user, the device must also include a load, for example a resistor 20, as well as a switch 22 (preferably an electronic switch), which is controlled by the electronic circuit. Additionally, the battery can be connected to the load by this switch and can be discharged accordingly.

The microcontroller 16 detects the charged state of the battery 18, for example by comparing the actual battery voltage with the nominal voltage of the battery, which is also stored in the microcontroller 16. An exchange of the battery 18, can result in a microcontroller 16 reset and can therefore also be easily detected. In the case of devices where the microcontroller 16 also controls the charging action of the battery 18, the fully charged state of the battery 18 is preferably recognized such that a condition for completion of the charging action, which is known per se, is met.

In the cases where the battery-operated device includes a display for the charge state of the rechargeable battery, then, after automatic discharge of the battery, a user can ensure recharge by means of the charge state display. It is, however, particularly advantageous if the electronic circuit includes a device that detects the connection of the device with an external source of electrical energy, for example an electrical outlet or a charging set that is ready for operation, which allows the battery to be recharged again. If the device is connected to the external energy source, the battery is preferably recharged automatically. It is advantageous if the battery is only automatically discharged if it is connected to the external energy source.

In order to improve the accuracy of the method, the voltage threshold value can be determined so as to be temperature-compensated, i.e. it is changed depending on the temperature.

A number of embodiments of the invention have been described. Nevertheless, it will be understood that various modifications may be made without departing from the spirit and scope of the invention. Accordingly, other embodiments are within the scope of the following claims.

What is claimed is:

1. A method of conditioning a rechargeable battery, the method comprising:

providing a fully charged rechargeable battery;

measuring a discharge time for which the voltage of the battery takes to decrease to a voltage threshold value;

comparing the discharge time to a reference value, and if the discharge time is less than the reference value, shorting the battery through a discharge load to further discharge the battery.

2. The method of claim 1, further comprising:

measuring a current flow during discharge;

from the measured current flow and the measured discharge time, determining a charge quantity;

comparing the determined charge quantity with the charge quantity of a reference value; and if the battery voltage drops to the voltage threshold value before the charge quantity corresponding to the reference value is released, shorting the battery through the discharge load to further discharge the battery.

3. The method of claim 1 or 2, wherein shorting the battery through a discharge load fully discharges the battery.

4. The method of claim 2, wherein the current flow is measured while also measuring the discharge time.

5. The method of claim 1 or 2, further comprising:

measuring a first time interval which has passed since the battery voltage last dropped to the voltage threshold value;

determining whether the first time interval exceeds a maximum reference time; and if the first time interval exceeds the maximum reference time, shorting the battery through the discharge load to discharge the battery until the battery voltage drops to the voltage threshold value.

6. The method of claim 1 or 2, further comprising after shorting the rechargeable battery, recharging the rechargeable battery.

7. The method of claim 6, further comprising measuring again a discharge time for which the voltage of the battery takes to decrease to the voltage threshold value;

comparing again the discharge time to the reference value;

if the discharge time is again less than the reference value, indicating, on a display, that the discharge time is less than the reference value.

8. The method of claim 7, further comprising measuring again a current flow during discharge;

from the measured current flow and the measured discharge time, determining again the charge quantity;

comparing again the determined charge quantity with the charge quantity of the reference value;

if the battery voltage drops to the voltage threshold value again before the charge quantity corresponding to the reference value is released, indicating, on a display, that the charge quantity is less than the reference value.

9. The method of claim 7, wherein the current flow is measured while also measuring the discharge time.

10. The method of claim 1 or 2, further comprising:

measuring a second time interval since a latest replacement or charging of the battery;

comparing the second time interval to a minimum reference time; and if the second time interval exceeds the minimum reference time, and if during the second time interval the battery voltage dropped to the voltage threshold value due solely to self-discharge of the battery;

then activating a display to indicate that the rechargeable battery is aged or needs to be replaced.

11. The method of claim 1 or 2, further comprising changing the voltage threshold value to correspond with a change in temperature.

12. An electrical appliance comprising:

a discharge load;

a rechargeable battery for powering the electrical appliance connected through a switch to the discharge load for powering the discharge load;

a connector for connecting the appliance to an external source of electrical energy; and an electronic circuit that measures a discharge time for which the voltage of the battery takes to decrease to a voltage threshold value, compares the discharge time to a reference value, and if the discharge time is less than the reference value, shorts the battery through the discharge load to further discharge the battery only while the appliance is connected to the external energy source.

13. The appliance of claim 12, wherein the electronic circuit:

measures a current flow during discharge;

from the measured current flow during the measured discharge time, determines a charge quantity;

compares the determined charge quantity with the charge quantity of a reference value; and if the battery voltage drops to the voltage threshold value before the charge quantity corresponding to the reference value is released, shorts the battery through the discharge load to further discharge the battery.

14. The appliance of claim 12 or 13, wherein shorting the battery through the discharge load fully discharges the battery.

15. The appliance of claim 13, wherein the current flow is measured while also measuring the discharge time.

16. The appliance of claim 12 or 13, wherein the electronic circuit:

measures a first time interval which has passed since the battery voltage last dropped to the voltage threshold value;

determines whether the first time interval exceeds a maximum reference time; and if the first time interval exceeds the maximum reference time, shorts the battery through the discharge load to discharge the battery until the battery voltage drops to the voltage threshold value.

17. The appliance of claim 12 or 13, wherein the electronic circuit after shorting the rechargeable battery recharges the battery.

18. The appliance of claim 12 or 13, wherein the discharge load is a resistor disposed within the appliance.

19. The appliance of claim 12 or 13, wherein the appliance is an electric shaver.

20. The appliance of claim 12 or 13, wherein the appliance is an electric toothbrush.

* * * * *